United States Patent
Nizuka et al.

[11] Patent Number: 5,968,358
[45] Date of Patent: Oct. 19, 1999

[54] METHOD FOR WASHING HOLLOW FIBER MEMBRANE

[75] Inventors: Takeshi Nizuka; Takashi Uemura; Kenji Sugimoto, all of Osaka, Japan

[73] Assignee: Nissho Corporation, Osaka, Japan

[21] Appl. No.: 08/987,582

[22] Filed: Dec. 9, 1997

[30] Foreign Application Priority Data

Dec. 10, 1996 [JP] Japan ..................... 8-329389

[51] Int. Cl.⁶ ........................ B01D 69/08; B01D 65/02
[52] U.S. Cl. ........................ 210/500.23; 210/321.8; 210/321.89; 134/22.14; 134/22.19
[58] Field of Search .......................... 210/321.8, 321.89, 210/411, 500.23, 636; 264/41.49, 45.9, 209.1; 134/22.14, 22.19

[56] References Cited

U.S. PATENT DOCUMENTS 5,470,474  11/1995  Ansorge et al. ................. 210/500.23

FOREIGN PATENT DOCUMENTS 0 630 655  12/1994  European Pat. Off. .
07189015   7/1995   Japan .
07042014  10/1995   Japan .
08038862   2/1996   Japan .

OTHER PUBLICATIONS

*Patent Abstracts of Japan*, vol. 96, No. 2(Feb. 29, 1996) (JP–A–07252721).
WPI Database, Abstract Accession No. 95–37182, Derwent Publications, Ltd. (Week 9548) (JP–A–07252721).
*Chemical Abstracts*, vol. 124, No. 4, Abstract 37779, (Jan. 22, 1996) (JP–A–07252721).
*Patent Abstracts of Japan*, vol. 95, No. 1 (Feb. 28, 1995) (JP–A–06285161).
WPI Database, Abstract Accession No. 94–362658, Derwent Publications, Ltd. (Week 9445)(JP–A–06285161).
*Chemical Abstracts*, vol. 122, No. 8, Abstract 89515 (20 Feb. 1995) (JP–A–06285161).
*Patent Abstracts of Japan*, vol. 95, No. 2 (28 Feb. 1995) (JP–A–06285160).
WPI Database, Abstract Accession No. 94–362657, Derwent Publications, Ltd. (Week 9445) (JP–A–06285160).

*Primary Examiner*—John Kim
*Attorney, Agent, or Firm*—Leydig, Voit & Mayer, Ltd.

[57] ABSTRACT

A method for washing a hollow fiber membrane used for blood dialysis, comprising washing the inner wall of the hollow fiber with a clearing solvent comprising, as a main component, a specific aliphatic hydrocarbon having a boiling point of 110–240° C. and a flash point of not less than 21° C. According to the present invention, the lipophilic liquid contained in the core part of the hollow fiber can be removed selectively without removing the glycerol filled in the pores of the hollow fiber membrane. In addition, the method of the present invention is free of the problems of flammability and pollution of global environment.

2 Claims, No Drawings

METHOD FOR WASHING HOLLOW FIBER MEMBRANE

TECHNICAL FIELD OF THE INVENTION

The present invention relates to a method for washing a hollow fiber membrane used for blood dialysis. More particularly, the present invention relates to a method for washing a hollow fiber membrane comprising washing the inner wall of the hollow fiber with a clearing solvent comprising a specific aliphatic hydrocarbon as a main component.

BACKGROUND OF THE INVENTION

A hollow fiber membrane is typically prepared by extruding a polymer solution for forming a fiber from an outer circular part of a double tube nozzle, concurrently with a core liquid including a lipophilic liquid, such as liquid paraffin, or a core gas, such as nitrogen gas, from the center of the nozzle to form a hollow fiber, while forming micropores in the membrane at the same time. Then, the hollow fiber membrane is washed with water, impregnated with an aqueous solution of glycerol in the fine pores therein, and wound up in a bobbin. Thereafter, a fiber bundle comprising a number of such hollow fibers is housed in a plastic case to give a hollow fiber membrane module.

It is a common practice to wash a hollow fiber membrane with ether, chlorofluorocarbon and the like to remove the core liquid in the hollow fiber or waste, dust and the like present in the core (hollow) part of the hollow fiber before or after forming the hollow fiber membrane module. However, ether may possibly start a fire, since it has a low boiling point and a low flash point. Moreover, washing with ether results in removal of glycerol filled in the fine pores in the hollow fiber membrane, thus lowering the water-permeability of the hollow fiber membrane after washing. In addition, ether easily produces peroxides upon heating and said peroxides exert adverse influence on the hollow fiber to cause degradation of the fiber.

A method comprising washing with a chlorofluorocarbon, such as trichlorotrifluoroethane having a high ozone depletion coefficient of 0.8, leads to the depletion of ozone layer, which in turn worsens the global environment, so that the use of trichlorotrifluoroethane is now restricted as being among specific fleons. While a chlorofluorocarbon such as dichloropentafluoropropane having a low ozone depletion coefficient of 0.2 may be used, this compound is associated with a drawback that it not only degrades the plastic case containing a hollow fiber bundle, but washes away glycerol filled in the fine pores in the hollow fiber membrane.

It is therefore an object of the present invention to overcome the problems of inflammability and pollution of global environment and to provide a method for washing a hollow fiber membrane to remove waste, dust and the like, which are present in the core part of the hollow fiber, and selectively remove a lipophilic liquid present in the core part of the hollow fiber without removing glycerol, polyethylene glycol and the like filled in the fine pores of the hollow fiber membrane, or degrading the case containing the hollow fiber bundle.

SUMMARY OF THE INVENTION

Accordingly, the present invention provides a method for washing a hollow fiber membrane used for blood dialysis, comprising washing the inner wall of the hollow fiber with a clearing solvent comprising, as a main component, a specific aliphatic hydrocarbon having a boiling point of 110–240° C. and a flash point of not less than 21° C.

The present invention further provides the above-mentioned method wherein the core liquid of lipophilic liquid is removed from the hollow fiber.

The present invention yet provides the above-mentioned method for washing a hollow fiber membrane, wherein the aliphatic hydrocarbon is at least one compound selected from the group consisting of nonane, decane, undecane and dodecane.

DETAILED DESCRIPTION OF THE INVENTION

The lipophilic liquid to be used as the core liquid includes, for example, liquid paraffin, isopropyl myristate and the like. These have good affinity for the clearing solvent to be used in the present invention and can dissolve in the clearing solvent in an optional ratio. Examples of the material of the case include polystyrene, acrylic resin, polycarbonate and the like. After removing most of the lipophilic liquid from the core part of the hollow fiber by physical means such as physical dropping of the lipophilic liquid or centrifugation of the hollow fiber membrane, the remaining lipophilic liquid is washed away with the clearing solvent to be used in the present invention.

The clearing solvent preferably satisfies the requirements of being capable of dissolving the lipophilic core liquid, being insoluble with hollow fiber or glycerol, being non-degrading a plastic case, having small possibility of firing, being free from depletion of the ozone layer and the like.

The clearing solvent to be used in the present invention contains an aliphatic hydrocarbon having a boiling point of 110–240° C., preferably 134–179° C., and a flash point of not less than 21° C., preferably 23–56° C., as a main component. When the boiling point is less than 110° C., the flash point becomes lower, thus greatly increasing the possibility of firing, whereas when it exceeds 240° C., volatility decreases to result in propensity toward difficult removal thereof by through-flow drying or drying under reduced pressure. Examples of preferred aliphatic hydrocarbon include n-nonane, n-decane, n-undecane, n-dodecane and isomers thereof, which may be used alone or in combination.

Said clearing solvent may contain aliphatic hydrocarbon other than the above-mentioned aliphatic hydrocarbon and aromatic hydrocarbon, as long as they do not impair the object of the present invention.

The method for removing waste, dust and the like, which are present in the core part of the hollow fiber, with the inventive clearing solvent containing aliphatic hydrocarbon as a main component is not particularly limited. The hollow fiber membrane can be immersed in the above-mentioned clearing solvent, or the above-mentioned clearing solvent can be flown in the core part of the hollow fiber membrane and then the clearing solvent can be physically dropped, or the above-mentioned clearing solvent can be led into the core part or throughout the hollow fiber. In this case, the clearing solvent is preferably run at a rate of 100–1,000 ml/min/module. The washing step may be applied to the hollow fiber before or after setting a bundle thereof in a case. While the washing is generally performed at room temperature, the temperature may be raised to not more than 50° C. to improve washing performance. The clearing solvent contained in the core part of the hollow fiber can be dried after washing by aeration, centrifugation, evaporation under reduced pressure and the like.

The hollow fiber to be used in the present invention is subject to no particular limitation as long as it can be used for blood dialysis. Examples of the material of the hollow fiber include cellulose triacetate, cellulose diacetate, cuprammonium rayon, polysulfone, polyethersulfone, poly(methyl methacrylate) and the like. The inner diameter, outer diameter, pore diameter and pore density of the hollow fiber are not particularly limited, but the inner diameter is generally 100–350 μm, outer diameter is generally 130–450 μm and pore diameter is generally 15–200 Å. In general, 1,000–20,000 hollow fibers are bundled and housed in a blood dialysis case to give a module.

The present invention is described in more detail by way of Examples, which should not be construed as limiting the invention.

EXAMPLE 1

Using liquid paraffin as a core liquid, hollow fibers were made from cellulose triacetate, the hollow fibers having a pore diameter of 70 Å. Then, the hollow fibers were washed with water, treated with a 50 wt % aqueous glycerol solution to fill glycerol in the pores in the hollow fibers (amount of glycerol: 10 g/module), and dried. The obtained hollow fibers were bundled by 1,000 fibers and the obtained bundle was placed in a blood dialyzer case made from a polycarbonate.

The both ends of the hollow fiber bundle were fixed with a urethane adhesive to give a module. The liquid paraffin was removed as completely as possible in advance by physical dropping, and a mixture of nonane isomers having a boiling point of 134–138° C. and flash point of 23° C. was passed through the core part of the hollow fibers for 10 min at a rate of 500 ml/min/module. The amount of lipophilic liquid contained in the membrane, amount of residual solvent, amount of glycerol and membrane properties are shown in Table 1.

As is evident from Table 1, the glycerol in the pores of the membrane was not removed, but only the liquid paraffin remaining in the core part of the hollow fiber was. Then, dry air having a temperature of 60° C. was passed through the core of the fibers for 10 min, whereby the nonane isomer mixture was removed and a blood dialyzer having superior membrane permeability was afforded.

TABLE 1

|  | amount of lipo- philic liquid | amount of residual solvent | glycerol amount | leak | UFR |
|---|---|---|---|---|---|
| Ex. 1 | below d.l. | below d.l. | 10 | none | 76 |
| Ex. 2 | below d.l. | below d.l. | 10 | none | 75 |
| Ex. 3 | below d.l. | below d.l. | 10 | none | 78 |
| Ex. 4 | below d.l. | below d.l. | 10 | none | 75 |
| Ex. 5 | below d.l. | below d.l. | 10 | none | 76 |
| Ex. 6 | below d.l | below d.l. | 10 | none | 75 |
| Ex. 7 | below d.l. | below d.l. | 10 | none | 25 |
| Com. Ex. 1 | below d.l. | below d.l. | 0 | yes | n.m. |
| Com. Ex. 2 | below d.l. | below d.l. | 10 | none | 0.3 |

Note:
The "below d.l." means "below detection limit" and "n.m." means "not measurable".

The measurement methods used with respect to Table 1 were as follows.
Amount of Lipophilic Liquid: mg/Module
A 40% aqueous ethanol solution was circulated through the core part and on the outer surface of the hollow fibers in the module at 37° C. for 5 hr, and the amount of lipophilic liquid in the aqueous solution was measured by gas chromatography.
Amount of Residual Solvent: mg/Module (1) EXAMPLES 1 to 7
A 40% aqueous ethanol solution was circulated through the core part and on the outer surface of the hollow fibers in the module at 37° C. for 5 hr, and the amount of residual solvent in the aqueous solution was measured by gas chromatography.

(2) COMPARATIVE EXAMPLES 1 and 2
The module was placed in a closed container and heated at 75° C. for 3 hr. The amount of residual solvent in the gas in the container was measured by gas chromatography.
Amount of Glycerol: g/Module
A 40% aqueous ethanol solution was circulated through the core part and on the outer surface of the hollow fibers in the module at 37° C. for 5 hr, and the amount of glycerol in the aqueous solution was measured by high performance liquid chromatography.
Leak
A pressure of 0.5 atm was applied for 5 sec to the dialysis solution side of the module, and the module was placed under water surface to observe presence or absence of air bubbles.
UFR, Water Permeation Performance: ml/hr·mmHg·m$^2$
Measured according to UFR measurement method 4C (STOP method) of Dialyzer Performance Evaluation Standard (Japanese Society for Artificial Organs).

EXAMPLE 2

In the same manner as in Example 1 except that n-nonane (boiling point 151° C. and flash point 31° C.) was used as a clearing solvent instead of the nonane isomer mixture at room temperature at a rate of 500 ml/min/module, the amount of lipophilic liquid contained in the membrane, amount of residual solvent, amount of glycerol and membrane properties were measured, the results of which are shown in Table 1.

As is evident from Table 1, the glycerol in the pores in the membrane was not removed, but only the liquid paraffin remaining in the core of the hollow fiber was. Then, dry air having a temperature of 40° C. was passed through the module for 5 min and air having room temperature was passed through the module for 5 min, whereby the n-nonane was removed and a blood dialyzer having superior membrane permeability was afforded.

EXAMPLE 3

In the same manner as in Example 1 except that n-decane (boiling point 174° C. and flash point 46° C.) was used as a clearing solvent instead of the nonane isomer mixture at room temperature at a rate of 500 ml/min/module, the amount of lipophilic liquid contained in the membrane, amount of residual solvent, amount of glycerol and membrane properties were measured, the results of which are shown in Table 1.

As is evident from Table 1, the glycerol in the pores of the membrane was not removed, but only the liquid paraffin remaining in the core of the hollow fiber was. Then, dry air having a temperature of 60° C. was passed through the module for 10 min and the module was stood under reduced pressure of 0.8 mmHg for 20 min, whereby the n-decane was removed and a blood dialyzer having superior membrane permeability was afforded.

EXAMPLE 4

In the same manner as in Example 1 except that a mixture of dodecane isomers (boiling point 179° C. and flash point 56° C.) was passed through as a clearing solvent instead of the nonane isomer mixture at room temperature at a rate of 500 ml/min/module for 10 min, the amount of lipophilic liquid contained in the membrane, amount of residual solvent, amount of glycerol and membrane properties were measured, the results of which are shown in Table 1.

As is evident from Table 1, the glycerol in the pores of the membrane was not removed, but only the liquid paraffin remaining in the core of the hollow fiber was. Then, dry air having a temperature of 60° C. was passed through the module for 10 min and the module was stood under reduced pressure of 0.8 mmHg for 20 min, whereby the dodecane isomers were removed and a blood dialyzer having superior membrane permeability was afforded.

COMPARATIVE EXAMPLE 1

In the same manner as in Example 1 except that ethyl alcohol was used for washing instead of the nonane isomer mixture, the amount of lipophilic liquid contained in the membrane, amount of residual solvent, amount of glycerol and membrane properties were measured, the results of which are shown in Table 1. As is evident from Table 1, the glycerol in the hollow fiber was also removed, thus resulting in a hollow fiber membrane having significantly degraded membrane properties.

COMPARATIVE EXAMPLE 2

In the same manner as in Example 1 except that dichlorofluoropropane was used for washing instead of the nonane isomer mixture, the amount of lipophilic liquid contained in the core of the membrane, amount of residual solvent, amount of glycerol and membrane properties were measured, the results of which are shown in Table 1. As is evident from Table 1, cracks occurred in the blood dialyzer case which was made from polycarbonate, and washing could not be performed.

EXAMPLE 5

The inside of the module obtained in Example 2 was filled with an aqueous glycerol solution, and the amount of lipophilic liquid contained in the membrane, amount of residual solvent, amount of glycerol and membrane properties were measured, the results of which are shown in Table 1. As is evident from Table 1, a blood dialyzer having superior membrane permeability was afforded.

EXAMPLE 6

In the same manner as in Example 1 except that isopropyl myristate was used as a core liquid instead of the liquid paraffin, and n-nonane was passed for washing instead of the nonane isomer mixture at room temperature at a rate of 500 ml/min/module for 10 min, the amount of lipophilic liquid contained in the membrane, amount of residual solvent, amount of glycerol and membrane properties were measured, the results of which are shown in Table 1.

As is evident from Table 1, the glycerol in the pores of the membrane was not removed, but only the isopropyl myristate remaining in the hollow fiber was. Then, dry air having a temperature of 40° C. was passed through the core part of the fibers for 5 min, whereby the n-decane was removed and a blood dialyzer having superior membrane permeability was afforded.

EXAMPLE 7

In the same manner as in Example 1 except that cuprammonium rayon was used as the hollow fiber instead of the cellulose triacetate, isopropyl myristate was used as the core liquid instead of the liquid paraffin, and n-nonane was passed for washing instead of the nonane isomer mixture at room temperature at a rate of 500 ml/min/module for 10 min, the amount of lipophilic liquid contained in the membrane, amount of residual solvent, amount of glycerol and membrane properties were measured, the results of which are shown in Table 1.

As is evident from Table 1, the glycerol in the pores of the membrane was not removed, but only the isopropyl myristate remaining in the hollow fiber was. Then, dry air having a temperature of 40° C. was passed through the fibers for 5 min, whereby the n-nonane was removed and a blood dialyzer having superior membrane permeability was afforded.

The clearing solvent to be used in the method of the present invention is free from depletion of ozone layer or possible firing during washing process. The hollow fiber membrane is free of degradation in the property caused by the washing process, or degradation of the case housing the hollow fiber bundle. The module containing glycerol as a hollow fiber pore-retention agent could be washed to remove lipophilic liquid contained in the core of the hollow fiber, without removing the glycerol filled in the pores of the hollow fiber membrane.

This application is based on application No. 8-329389 filed in Japan, the content of which is incorporated hereinto by reference.

What is claimed is:

1. A method for washing a hollow fiber membrane used for blood dialysis, comprising washing the inner wall of the hollow fiber with a clearing solvent comprising at least one hydrocarbon selected from the group consisting of nonane, decane, undecane, and dodecane.

2. The method of claim 1, wherein said hollow fiber membrane comprises a core liquid of lipophilic liquid, and wherein said method removes said core liquid from the hollow fiber.

\* \* \* \* \*